United States Patent
Inamdar

(10) Patent No.: US 9,220,012 B1
(45) Date of Patent: Dec. 22, 2015

(54) SYSTEMS AND METHODS FOR PROVISIONING DEVICES

(71) Applicant: MARVELL INTERNATIONAL LTD., Hamilton (BM)

(72) Inventor: Amey Dattatray Inamdar, Pune (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/156,286

(22) Filed: Jan. 15, 2014

Related U.S. Application Data

(60) Provisional application No. 61/752,784, filed on Jan. 15, 2013.

(51) Int. Cl.
*H04L 29/06* (2006.01)
*H04W 12/08* (2009.01)

(52) U.S. Cl.
CPC ............ *H04W 12/08* (2013.01); *H04L 63/0435* (2013.01); *H04L 63/0457* (2013.01); *H04L 63/108* (2013.01)

(58) Field of Classification Search
CPC ............ G06F 21/31; G06F 2221/2115; G06F 2221/2137; G06Q 20/14; G06Q 20/3829; H04L 63/108; H04L 63/0457; H04L 63/0892; H04L 63/0846
See application file for complete search history.

(56) References Cited

U.S. PATENT DOCUMENTS

| | | | |
|---|---|---|---|
| 2004/0034771 A1* | 2/2004 | Edgett et al. | 713/168 |
| 2005/0021781 A1* | 1/2005 | Sunder et al. | 709/229 |
| 2007/0254614 A1* | 11/2007 | Muralidharan et al. | 455/307 |
| 2008/0069105 A1* | 3/2008 | Costa et al. | 370/392 |
| 2011/0211219 A1* | 9/2011 | Bradley et al. | 358/1.15 |
| 2012/0008529 A1* | 1/2012 | Averbuch et al. | 370/255 |

OTHER PUBLICATIONS

International Standard, ISO/IEC 8802-11, ANSI/IEEE STD 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Peter Shaw
*Assistant Examiner* — Don Zhao

(57) ABSTRACT

In a method, implemented by a first device connected to a wireless network, for assisting in provisioning a second device for connection to the wireless network, the first device receives, via the wireless network and from a remote server, a public key corresponding to a private key stored in the second device. The first device uses the public key to encrypt network security information stored in the first device, the network security information including information that is useable to securely connect to the first wireless network. The first device wirelessly transmits, for reception by the second device, a signal carrying the encrypted network security information.

19 Claims, 6 Drawing Sheets

(56) References Cited

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

van Nee, et al. "The 802.11n MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

\* cited by examiner

SYSTEMS AND METHODS FOR PROVISIONING DEVICES

CROSS-REFERENCES TO RELATED APPLICATIONS

This claims the benefit of U.S. Provisional Patent Application No. 61/752,784, entitled "Automatic Provisioning Using Vendor Specific IE in Beacons," and filed on Jan. 15, 2013, the disclosure of which is incorporated herein by reference.

FIELD OF THE DISCLOSURE

The present disclosure relates generally to communication networks and, more particularly, to provisioning of devices in wireless local area networks such as in-home wireless networks.

BACKGROUND

WiFi networks, such as the Institute for Electrical and Electronics Engineers (IEEE) 802.11a, 802.11b, 802.11n or 802.11ac networks, are now commonly used within the home. In addition to providing network connectivity to computing devices such as laptop computers and smartphones, these home networks can provide connectivity to various "smart" devices in the home, such as thermostats, water heaters, light control units, etc. To gain access to the home network, a new device generally must first be "provisioned." Provisioning is a process by which a WiFi-enabled device obtains network credentials that enable secure connection to the home network. Once connected, the device can access various services, such as Internet service, through the WiFi access point (AP). As just one example, if a WiFi-enabled thermostat is connected to the home network, a home owner may use an application running on a smartphone to remotely control the temperature in his or her home via the Internet.

For conventional home networks, a user (e.g., home owner, home resident, etc.) typically must perform various actions to provision a WiFi-enabled device. A first, "microAP-based" technique may be used if a device to be connected supports a microAP mode in which the device can host its own WiFi network. With this technique, appropriate security credentials are used to associate a client (e.g., a laptop or other personal computer) with a wireless network hosted by the device to be provisioned/connected. Next, the user opens a web browser on the client and starts a provisioning web application. The user then views scan results provided by the device and selects the desired home network. Finally, the user provides the appropriate home network security credentials, and verifies that the device can connect to the home network.

A second technique, known as "WiFi Protected Setup" or "WPS," may be used if both the AP of the home network and the device to be provisioned/connected support WPS-based provisioning. With WPS, a user must physically press a button on both the AP of the home network and the device. The two buttons must be pressed within a two minute time window, which may be inconvenient when the AP and the device are not in close proximity. Moreover, the button on the device to be provisioned/connected may not be easily accessible (e.g., if the device is a water heater).

For each of the two conventional techniques described above, the process generally must be repeated for each additional device that is provisioned and connected to the home network. As a result, provisioning numerous devices in the home can require a significant amount of time and effort.

SUMMARY

In one embodiment, a method, implemented in a first device connected to a first wireless network, is for assisting in provisioning a second device for connection to the first wireless network. The method includes receiving, at the first device and from a remote server via the first wireless network, a public key corresponding to a private key stored in the second device. The method also includes using, at the first device, the public key to encrypt network security information stored in the first device, wherein the network security information includes information that is useable to securely connect to the first wireless network. The method further includes causing the first device to wirelessly transmit, for reception by the second device, a signal carrying the encrypted network security information.

In another embodiment, a device comprises a memory storing network security information, wherein the network security information includes information that is useable to securely connect to a first wireless network. The device also comprises a controller that is (i) operable as a station of the first wireless network and (ii) operable as an access point of a second wireless network. The controller is configured to receive a public key via the first wireless network, wherein the public key corresponds to a private key stored in a different device, encrypt the network security information using the public key, and cause the device to transmit, for reception by the different device, a beacon associated with the second wireless network, wherein the beacon associated with the second wireless network includes the encrypted network security information.

In yet another embodiment, a method, implemented in a first device, is for provisioning the first device for connection to a first wireless network. The method includes receiving, at the first device, encrypted network security information from a second device already connected to the first wireless network, wherein the encrypted network security information was encrypted using a public key corresponding to a private key stored in the first device. The method additionally includes using, at the first device, the private key to decrypt the encrypted network security information, and causing the first device to securely connect to the first wireless network using the decrypted network security information.

In still another embodiment, a device comprises a memory storing a private key. Additionally, the device comprises a controller configured to receive encrypted network security information from a different device already connected to a first wireless network, wherein the encrypted network security information was encrypted using a public key corresponding to the private key. The controller is also configured to use the private key to decrypt the encrypted network security information, and cause the device to securely connect to the first wireless network using the decrypted network security information.

BRIEF DESCRIPTION OF THE DRAWINGS

Like reference numbers in the various drawings indicate like elements.

DETAILED DESCRIPTION

In embodiments described below, a first device is provisioned for home network connectivity using any suitable provisioning technique, such as the conventional microAP-based or WPS-based provisioning technique discussed above. After the first device connects to the home network, a remote server and the first device assist in automatically provisioning one or more additional devices by securely providing the device(s) with the appropriate home network credentials. In one embodiment, for example, the server sends the connected first device a public key that corresponds to a private key stored in a newly-added second device. The first device then encrypts the home network credentials with the public key so that the credentials can be securely sent to the second device in a wireless signal (e.g., in a beacon), in an embodiment. The credentials can then be decrypted by the second device using the corresponding private key, and used to connect to the home network. By only transmitting credentials after encryption with the public key, security of the home network is maintained.

Figure 1:
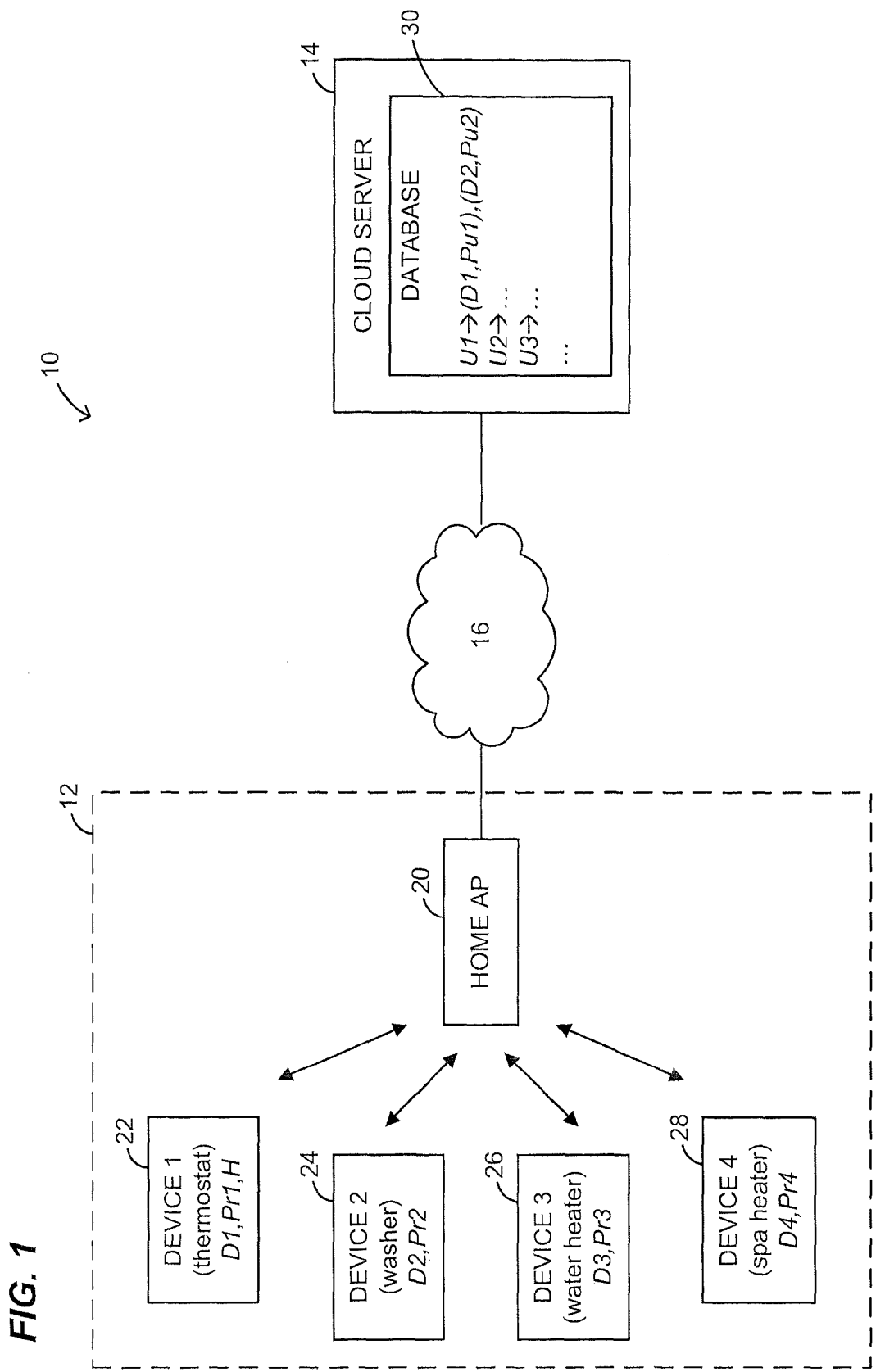
FIG. 1 is a block diagram of an example system in which home network provisioning techniques are implemented, according to an embodiment.

FIG. 1 is a block diagram of an example system 10 in which home network provisioning techniques are implemented, according to an embodiment. The example system 10 includes a home network 12, a cloud server 14, and a network 16 that communicatively couples the home network 12 to the cloud server 14. The home network 12 includes an access point (AP) 20 of the home network 12, such as a wireless router device, for example. In an embodiment, the AP 20 connects directly, or via a modem or other device(s), to network 16 via an Ethernet or other suitable connection. In the example system 12, the home network 12 is a WiFi network, with AP 20 being a WiFi AP. In other embodiments, however, the home network 12 is a different type of wireless local area network (WLAN), wireless personal area network (WPAN), or other suitable network type, and/or is not located within a home.

The home network 12 also includes a first device 22, a second device 24, a third device 26, and a fourth device 28. While each of the devices 22, 24, 26 and 28 is shown in FIG. 1 as being within the home network 12, it is understood that each device is not a part of the home network 12 until the device has been properly provisioned and connects to the home network 12. That is, in at least some of the scenarios described below, one or more of the devices 22, 24, 26 and 28 is/are not initially included within home network 12. In the example system 10 of FIG. 1, device 22 is a WiFi-enabled thermostat, device 24 is a WiFi-enabled washer, device 26 is a WiFi-enabled water heater, and device 28 is a WiFi-enabled spa heater. In other embodiments and/or scenarios, however, the home network 12 includes different types of WiFi-enabled devices, such as "smart" light control units, security devices, etc. Moreover, in some embodiments and/or scenarios, the home network 12 includes more or fewer than four WiFi-enabled devices.

In an embodiment, each of the devices 22, 24, 26 and 28 stores a respective device identifier (shown as D1, D2, D3 and D4, respectively, in FIG. 1). In one embodiment, the device identifier is an identifier assigned by the respective device vendor, and uniquely identifies the corresponding device. Further, in an embodiment, each of the devices 22, 24, 26 and 28 stores a respective private key (shown as Pr1, Pr2, Pr3 and Pr4, respectively, in FIG. 1), each of which corresponds to a corresponding public key (i.e., is a part of a public-private key pair). The structure of devices 22 and 24 is described below in connection with FIG. 2, according to one embodiment, and the operation of devices 22 and 24 is described below in connection with FIGS. 3 and 4, according to two alternative embodiments.

The network 16 includes one or more sub-networks. In various embodiments, for example, network 16 includes one or more wired and/or wireless Ethernet local area networks (e.g., including routers, bridges, etc.). The cloud server 14 communicates with the home network 12 via the network 16.

The cloud server 14 provides provisioning services to various users, including a user associated with the home network 12 (e.g., a resident of the home in which the home network 12 is located), in an embodiment. In some embodiments, the cloud server 14 includes one or more physical processors (not shown in FIG. 1) that implement server-side operations of the provisioning techniques described herein. In one embodiment, one or more of the physical processors are hardware processors, such as integrated circuits (e.g., application specific integrated circuits (ASICs), programmable logic devices, etc.) or a collection of discrete hardware components, for example. In another embodiment, one or more of the physical processors is/are configured to read and execute software or firmware instructions stored on a tangible, non-transitory, computer-readable memory (e.g., a magnetic disk, optical disk, random access memory (RAM), read-only memory (ROM), flash memory, etc.). In some embodiments, the software or firmware instructions include machine-readable instructions that, when executed by the processor(s), cause the processor(s) to perform some or all of the server-side provisioning operations (e.g., such as the server-side operations described below in connection with FIG. 3 or FIG. 4).

To support provisioning services, in an embodiment, the cloud server 14 includes a database 30, which stores a record associating each of a plurality of users with devices that the user has connected, or wishes to connect, to the user's home network. In an embodiment, each of the users is associated with an identifier (e.g., account number) stored in the database 30. In FIG. 1, example identifiers are shown as U1, U2 and U3, with U1 being the identifier for the user associated with home network 12 (e.g., residing in the home that includes home network 12), U2 being the identifier for a different user associated with a different home network, etc.

In the embodiment and scenario of FIG. 1, the database 30 maps the user U1 associated with home network 12 to the first device 22 and the second device 24. More specifically, in this embodiment/scenario, the database 30 stores the device identifier D1 and public key Pu1 of device 22 and the device identifier D2 and public key Pu2 of device 24, and maps both pairs (D1, Pu1), (D2, Pu2) to the user U1. In the particular embodiment/scenario of FIG. 1, the cloud server 14 has not yet been informed that devices 26 and 28 are to be provisioned for connectivity to the home network 12, and therefore has not yet mapped information associated with devices 26, 28 to the user U1. In some embodiments in which each user (or an organization, etc.) is associated with multiple networks, the database maps each user to each of the user's networks, and separately maps each of those networks to one or more devices.

In an embodiment, the cloud server 14 maps users to device information in response to the respective users securely connecting to cloud server 14 and entering indications of the device(s) to be added. In one embodiment and scenario, for example, cloud server 14 associates user U1 with (D2, Pu2) in response to user U1 entering the device identifier D2 on a secure (e.g., password-protected) web page hosted by cloud server 14. In various embodiments and/or scenarios, for example, the information is entered by user U1 via a user interface of a client device (e.g., laptop, smartphone, etc.) connected to home network 12, or via a cellular network. In one embodiment, cloud server 14 then uses the device identifier D2 to obtain the public key Pu2 corresponding to device 24 (e.g., by accessing a website maintained by the device vendor, in an embodiment). In other embodiments, the user U1 provides both the device identifier D2 and the public key Pu2 to the cloud server 14.

Operation of the cloud server 14, after the information (D2, Pu2) has been mapped to user U1, is described below in connection with FIGS. 3 and 4, according to two alternative embodiments.

Figure 2:
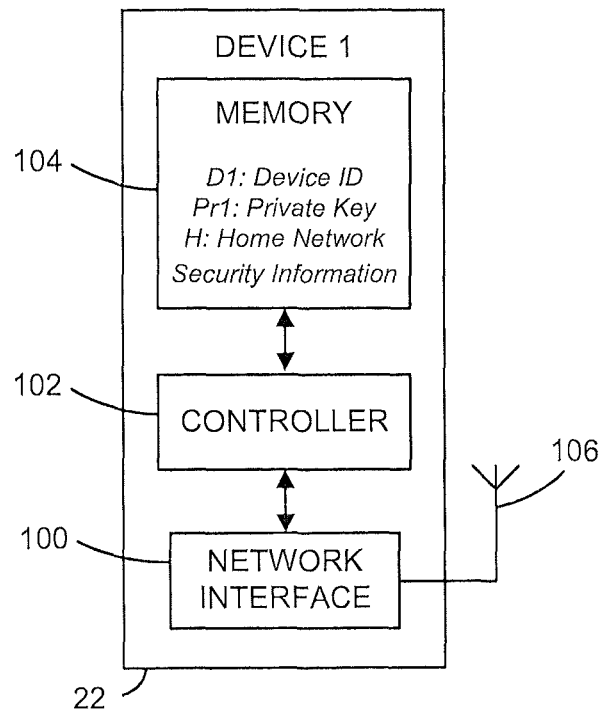
FIG. 2 is a block diagram showing two devices of the example system of FIG. 1 in more detail, according to an embodiment.
Figure 2:
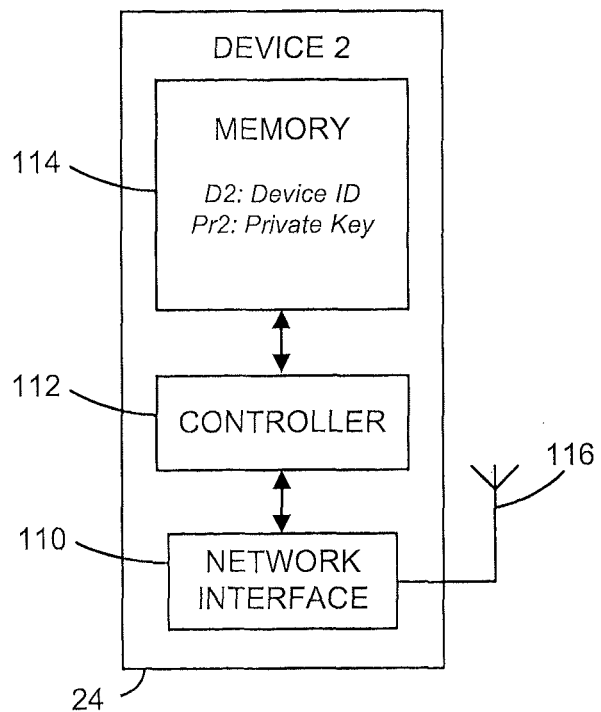

FIG. 2 is a block diagram showing device 22 and device 24 of the example system 10 in more detail, though still in a highly simplified manner, according to an embodiment. FIG. 2 depicts the devices 22, 24 (i.e., memory content of the devices 22, 24) at a time when device 22 has been provisioned with respect to home network 12, but device 24 has not yet been provisioned with respect to home network 12.

In the example embodiment of FIG. 2, device 22 includes a network interface 100, a controller 102, a memory 104, and one or more antennas 106. The network interface 100 is configured to support WiFi network communications. In one embodiment, for example, the network interface 100 is configured to generate WiFi packets, to cause the generated WiFi packets to be transmitted via antenna(s) 106, and to process (e.g., demodulate and decode) WiFi packets received via antenna(s) 106. The controller 102 communicates with the network interface 100 to support the provisioning techniques described herein. In one embodiment, the controller 102 operates in conjunction with the network interface 100 such that the device 22 can operate simultaneously as a "microAP" to host a first WiFi network, and as a station of a second WiFi network. In some embodiments, the network interface 100 is integrated within controller 102. In other embodiments, the network interface 100 and controller 102 are distinct (e.g., separate integrated circuits).

In some embodiments, the network interface 100 and/or the controller 102 include(s) one or more physical processors (not shown in FIG. 2) that implement the operations corresponding to device 22 that are described below in connection with FIG. 3, or (in an alternative embodiment) the operations corresponding to device 22 that are described below in connection with FIG. 4. In one embodiment, one or more of the physical processors are hardware processors, such as integrated circuits (e.g., ASICs, programmable logic devices, etc.) or a collection of discrete hardware components, for example. In another embodiment, one or more of the physical processors is/are configured to read and execute software or firmware instructions stored on a tangible, non-transitory computer-readable memory (e.g., a magnetic disk, optical disk, RAM, ROM, flash memory, etc.). In some embodiments, the software or firmware instructions include machine-readable instructions that, when executed by the processor(s), cause the processor(s) to perform some or all of the operations of device 22 that are described below in connection with FIG. 3, or, alternatively, some or all of the operations of device 22 that are described below in connection with FIG. 4.

Device 24 includes a network interface 110, a controller 112, a memory 114, and one or more antennas 116, in the example embodiment of FIG. 2. In an embodiment, network interface 110, controller 112, memory 114, and/or antenna(s) 116 are the same as or similar to network interface 100, controller 102, memory 104, and/or antenna(s) 106, respectively, of device 22. In some embodiments, for example, the network interface 110 and/or controller 112 include(s) one or more physical processors (not shown in FIG. 2) that implement the operations corresponding to device 24 that are described below in connection with FIG. 3, or (in an alternative embodiment) the operations corresponding to device 24 that are described below in connection with FIG. 4.

In the embodiment and scenario of FIG. 2, memory 104 of device 22 stores the device identifier (D1) and private key (Pr1) associated with device 22. Moreover, because FIG. 2 corresponds to a scenario in which device 22 has already been provisioned, memory 104 stores security information/credentials for home network 12, denoted as "H" in FIG. 2. In various embodiments, memory 104 includes one or more types of memory, such as RAM and/or ROM. In an embodiment, however, at least the private key Pr1 is stored in a ROM portion of memory 104 that is fixed at the time of manufacture.

Similar to memory 104, memory 114 of device 24 stores the device identifier (D2) and private key (Pr2) associated with device 24. Because FIG. 2 corresponds to a scenario in which device 24 has not yet been provisioned, however, memory 114 does not yet store the security information/credentials H. In various embodiments, memory 114 includes one or more types of memory, such as RAM and/or ROM. In an embodiment, however, at least the private key Pr2 is stored in a ROM portion of memory 114 that is fixed at the time of manufacture.

Operation of the system 10 will now be described for two alternative embodiments, which correspond to the sequence diagrams of FIGS. 3 and 4, respectively. Each of these embodiments is described with reference to the example system 10 of FIG. 1, and the example devices 22, 24 of FIG. 2. In each of FIGS. 3 and 4, a first (left-most) vertical timeline corresponds to device 24, a second vertical timeline corresponds to device 22, and a third vertical timeline corresponds to cloud server 14, with time advancing in the downward direction. Also in each of FIGS. 3 and 4, solid horizontal lines represent communications to or from the cloud server 14 (via both home network 12 and network 16), while dotted horizontal lines represent broadcast (beacon) communications transmitted by the source device (device 22 or device 24) while in a microAP mode, in an embodiment.

Figure 3:
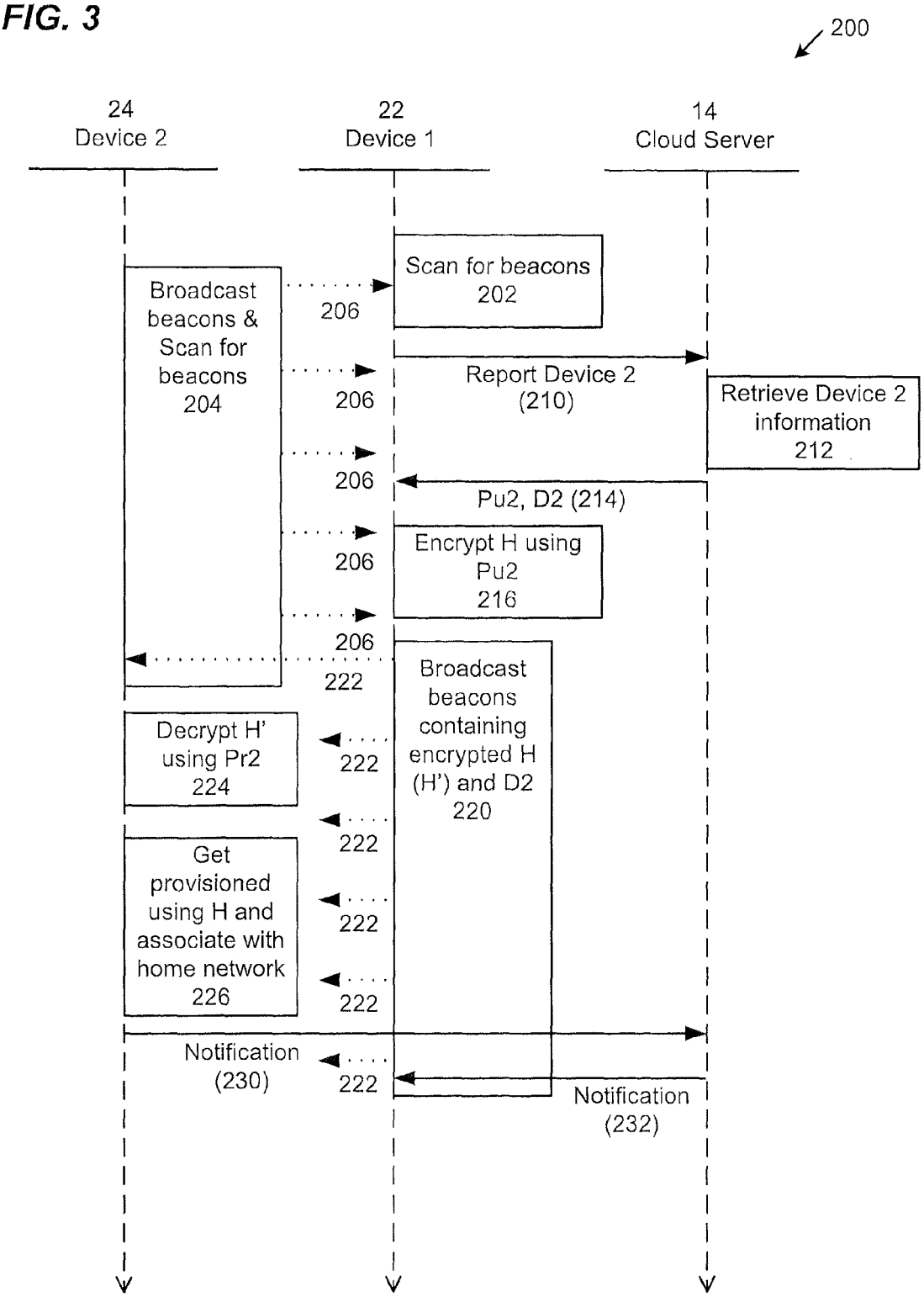
FIG. 3 is a sequence diagram corresponding to the example system and devices of FIGS. 1 and 2, according to an embodiment.

The sequence diagram 200 of FIG. 3 begins at a time when device 24 has not yet been provisioned for connectivity to home network 12, but device 22 has been provisioned, and is connected to, home network 12. Thus, device 22 (but not device 24) initially stores the home network credentials H, as shown in FIG. 2. In one embodiment, device 22 was provisioned using a conventional technique, such as the microAP-based or WPS-based technique discussed above, or using any other suitable technique. Also at the start of sequence diagram 200, in an embodiment, the cloud server 14 has already associated the user identity U1 with the new device 24 (e.g., in response to data entered securely and remotely by the user), and stores the device identifier D2 and public key Pu2 in the database 30 as shown in FIG. 1.

At process 202 of sequence diagram 200, the connected device 22 scans one or more channels for beacons, in an embodiment. In one embodiment, connected device 22 starts process 202 in response to receiving (via network 16 and AP 20) an indication from cloud server 14 that new device 24 has been mapped to user U1, and is therefore ready for provisioning. In another embodiment, connected device 22 continuously or intermittently scans for beacons during regular operation, and simply continues to perform such scans during, throughout, and/or after the timeline of sequence diagram 200.

At process 204, new device 24 broadcasts beacons 206 advertising the presence of new device 24. In an embodiment, each of the beacons 206 includes an information element containing the device identifier of new device 24, D2, retrieved from memory 114. In some embodiments, the beacons 206 are broadcast periodically while new device 24 acts as an AP in a microAP mode. In one such embodiment, the device identifier D2 is included in a vendor-specific information element, which is a size-limited (e.g., 255 bytes maximum) information element allocated within each microAP beacon. Also at process 204, new device 24 begins to scan one or more channels for beacons from other devices. While FIG. 3 shows broadcasting and scanning within process 204 as being coextensive in time, in some embodiments broadcasting and scanning begin and/or end at different times. In one embodiment, for example, new device 24 does not scan channels for beacons until after new device 24 has transmitted one or more of the beacons 206.

In the example scenario of sequence diagram 200, connected device 22 detects the first one of beacons 206, and in response stops scanning for beacons (i.e., ends process 202). In other embodiments, connected device 22 continues to scan for beacons despite having detected the beacon 206. After detecting the beacon 206, connected device 22 sends a report 210 to cloud server 14 indicating that new device 24 has been detected by connected device 22. In an embodiment, the report 210 includes the device identifier D2 that the connected device 22 had received in beacon 206. At process 212, upon receiving the report 210, cloud server 14 uses the device identifier D2 as an index to retrieve the public key of new device 24, Pu2, from database 30, in an embodiment. In some embodiments and/or scenarios in which database 30 does not yet store the public key Pu2, cloud server 14 uses the device identifier D2 to request the public key Pu2 from another server (e.g., a server maintained by a vendor of the new device 24). Next, in an embodiment, cloud server 14 sends a response 214 containing public key Pu2 and device identifier D2 to connected device 22 via network 16.

After receiving the response 214, connected device 22 retrieves the security information/credentials H from memory 104, and at process 216 encrypts H using the public key Pu2 that was received in message 214, in an embodiment. Thereafter, at process 220, connected device 22 broadcasts (while in microAP mode) beacons 222 that include an information element containing the encrypted version of H (designated as H' in FIG. 3) and the device identifier D2, in some embodiments. In one such embodiment, the encrypted information H' and the device identifier D2 are included in a vendor-specific information element, which is a size-limited (e.g., 255 bytes maximum) information element allocated within each microAP beacon. In some embodiments, connected device 22 operates in microAP mode (and transmits beacons) even prior to process 220, but does not include H' and D2 in an information element of any beacons until process 220 begins.

In some embodiments, the encrypted information H' and the device identifier D2 occupy substantially less than the entirety of a vendor-specific information element within each microAP beacon 222. In one embodiment, for example, H includes a 32 byte SSID and a 63 byte passphrase. In one embodiment, the security information/credentials H is 95 bytes. In another embodiment, the 32 byte SSID and the 63 byte passphrase are separated in the security information/credentials H by a one byte separator, and the security information/credentials H is 96 bytes. Using RSA1024 encryption of the 32+63=95 bytes, or the 32+63+1=96 bytes, in an embodiment, H' includes 130 encrypted bytes. In an embodiment in which the vendor-specific information element is limited to a maximum of 255 bytes, this leaves a suitable amount of space (i.e., up to 125 bytes) for inclusion of the device identifier D2 and, in some embodiments, any other suitable type of useful information. In other embodiments, other suitable lengths of the security information/credentials H and the encrypted information H' are utilized.

In the example scenario of sequence diagram 200, new device 24 detects the first one of beacons 222, and in response stops scanning for beacons in process 204. In other embodiments, new device 24 continues to scan for beacons even after detecting one of beacons 222. After receiving the beacon 222, new device 24 uses the private key Pr2 stored in memory 114 to decrypt the encrypted information H' at process 224, thereby recovering the original security credentials H. Next, at process 226, new device 24 uses the recovered security credentials H to get provisioned and associate with the home network 12.

In an embodiment, new device 24 then sends a notification 230 to cloud server 14. The notification 230 informs the cloud server 14 that new device 24 was successfully provisioned, in an embodiment. In response, in an embodiment, cloud server 14 sends a notification 232 to the earlier-connected device 22. In some embodiments, after receiving notification 232, device 22 does not send any additional beacons. In other embodiments, device 22 continues sending beacons 222, but omits encrypted information H' and device identifier D2 in all beacons 222 sent after device 22 receives and processes notification 232.

In alternative embodiments, device 24 does not send notification 230, and cloud server 14 does not send notification 232. Instead, in one such embodiment, device 22 locally detects (e.g., via AP 20) that device 24 is now connected to the home network 12, and in response either stops sending beacons 222, or omits H' and D2 in all subsequent beacons 222.

Figure 4:
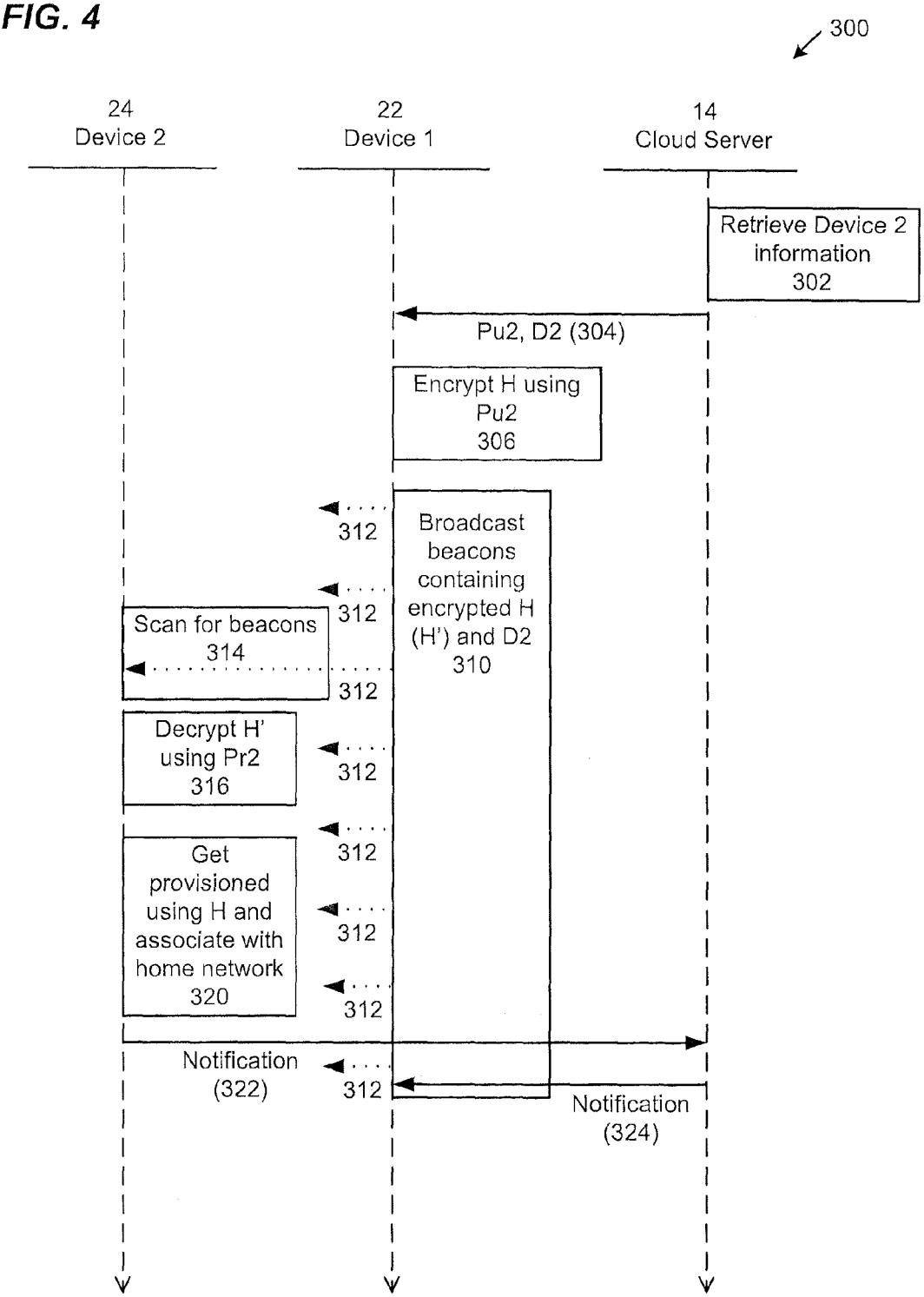
FIG. 4 is a sequence diagram corresponding to the example system and devices of FIGS. 1 and 2, according to an alternative embodiment.

Like the sequence diagram 200 of FIG. 3, the sequence diagram 300 of FIG. 4 begins at a time when device 24 has not yet been provisioned for connectivity to home network 12, but device 22 has been provisioned, and is connected to, home network 12 (and therefore stores the home network credentials H as shown in FIG. 2). In one embodiment, device 22 was provisioned using a conventional technique, such as the microAP-based or WPS-based technique discussed above, or using any other suitable technique. Also at the start of sequence diagram 300, in an embodiment, the cloud server 14 has already associated the user identity U1 with the new device 24 (e.g., in response to data entered securely and remotely by the user), and stores the device identifier D2 and public key Pu2 in the database 30, as shown in FIG. 1.

At process 302 of sequence diagram 300, cloud server 14 uses the device identifier D2 as an index to retrieve the public key of new device 24, Pu2, from database 30, in an embodiment. In an embodiment, process 302 is triggered in response to cloud server 14 receiving (e.g., via a user interface of a client device, home network 12, and network 16) an indication that new device 24 is to be mapped to user U1. In some embodiments and/or scenarios in which database 30 does not yet store the public key Pu2, cloud server 14 uses the device identifier D2 to request the public key Pu2 from another server (e.g., a server maintained by a vendor of the new device 24). Next, in an embodiment, cloud server 14 sends a message 304 containing public key Pu2 and device identifier D2 to connected device 22.

After receiving the message 304, connected device 22 retrieves the security information/credentials H from memory 104, and at process 306 encrypts H using the public key Pu2 that was received in message 304, in an embodiment. Thereafter, at process 310, connected device 22 broadcasts (while in microAP mode) beacons 312 that include an information element containing both the encrypted information H (with the encrypted version being designated as H' in FIG. 4) and the device identifier D2, in an embodiment. In some embodiments, connected device 22 operates in microAP mode (and transmits beacons) even prior to process 310, but does not include H' and D2 in an information element of any beacons until process 310 begins. In some embodiments, the information element that includes H' and D2 is a vendor-specific information element. In one embodiment, for example, the information element is a protocol-specified information element that may contain up to 255 bytes.

At process 312, new device 24 scans one or more channels for beacons. In some embodiments, new device 24 periodically scans for beacons during regular operation, and simply continues to perform such scans during, throughout, and/or after the timeline of sequence diagram 300. In the example scenario of sequence diagram 300, new device 24 detects the third one of beacons 312, and in response stops scanning for beacons in process 312. In other embodiments, new device 24 continues to scan for beacons even after detecting one of beacons 312. After receiving the beacon 312, new device 24 uses the private key Pr2 stored in memory 114 to decrypt the encrypted information H' at process 316, in an embodiment, thereby recovering the original security credentials H. Next, at process 320, new device 24 uses the recovered security credentials H to get provisioned and to associate with home network 12.

In an embodiment, new device 24 then sends a notification 322 to cloud server 14. The notification 322 informs the cloud server 14 that new device 24 was successfully provisioned, in an embodiment. In response, in an embodiment, cloud server 14 sends a notification 324 to the earlier-connected device 22. In some embodiments, after receiving notification 324, device 22 does not send any additional beacons. In other embodiments, device 22 continues sending beacons 312, but omits encrypted information H' and device identifier D2 in all beacons 312 sent after device 22 receives and processes notification 324.

In alternative embodiments, device 24 does not send notification 322, and cloud server 14 does not send notification 324. Instead, in one such embodiment, device 22 locally detects (e.g., via AP 20) that device 24 is now connected to the home network 12, and in response either stops sending beacons 312, or omits H' and D2 in all subsequent beacons 312.

One advantage of the embodiment of FIG. 4 is that the connected device 22 does not need to detect beacons sent by new device 24, and new device 24 does not need to transmit the beacons. On the other hand, the embodiment of FIG. 4 may, in some embodiments and/or scenarios, result in connected device 22 having to send beacons (or at least, beacons with the information element containing H' and D2) for a longer time period. With reference to FIG. 4, for example, new device 24 may not yet be powered up and/or ready to detect the beacons when connected device 22 starts transmitting beacons 312 with the information element containing H' and D2.

Figure 5:
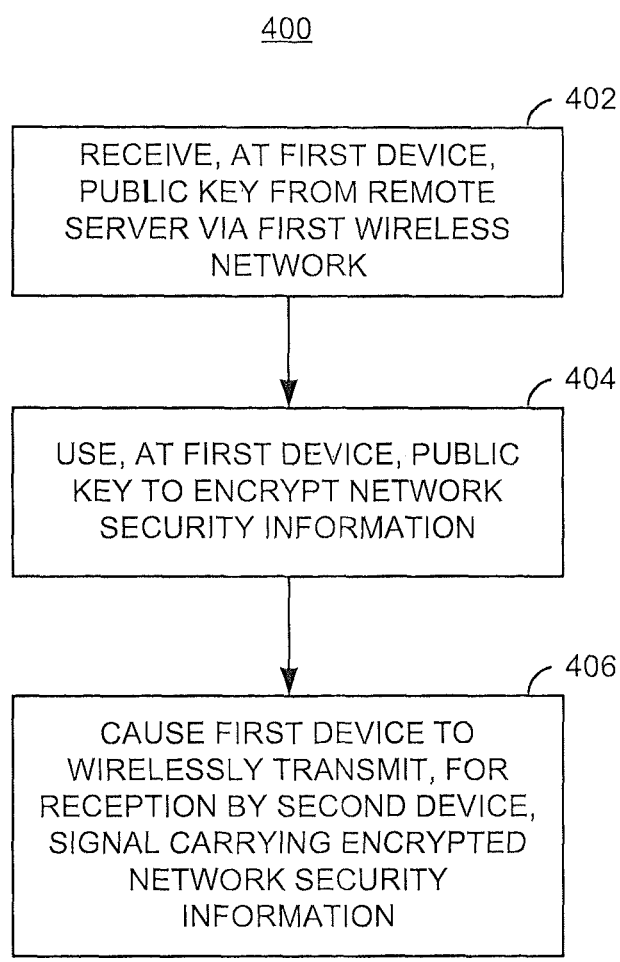
FIG. 5 is a flow diagram of an example method, implemented in a first device connected to a wireless network, of assisting in provisioning a second device for connection to the wireless network, according to an embodiment.

FIG. 5 is a flow diagram of an example method 400, implemented in a first device connected to a first wireless network, of assisting in provisioning a second device for connection to the first wireless network, according to an embodiment. In an embodiment, the first wireless network is a WiFi network similar to home network 12 of FIG. 1. In other embodiments, the first wireless network is a different, suitable network, such as a non-WiFi WLAN or WPAN, for example, and is located either within a home or in a different setting. In an embodiment, the method 400 is implemented in a device similar to or the same as device 22 of FIGS. 1 and 2, in order to assist in provisioning a device similar to or the same as device 24 of FIGS. 1 and 2. More specifically, in some embodiments, the method 400 is implemented by a controller similar to or the same as controller 102 of FIG. 2, and/or by a network interface similar to or the same as network interface 100 of FIG. 2. In other embodiments, the method 400 is implemented by a controller that includes the functionality of a network interface (e.g., controller 102, in an embodiment in which controller 102 includes network interface 100).

At block 402, a public key is received at the first device from a remote server via the first wireless network. The public key corresponds to (i.e., forms a public-private key pair with) a private key stored in the second device. In one embodiment, the public key is received at block 402 by a controller of the first device (such as controller 102 of FIG. 2, for example), after a signal containing the public key was received from a remote server via one or more antennas of the first device. In one embodiment in which the first wireless network is a WiFi network, for example, a remote server first sends the public key to an AP of the wireless network (such as AP 20 of FIG. 1, for example) within the payload of one or more Ethernet packets (e.g., via network 16), and the AP in turn sends the public key to the first device within the payload of one or more WiFi packets of the WiFi network.

At block 404, the public key received at block 402 is used to encrypt network security information stored in the first device. The network security information includes information that can be used to securely connect to the first wireless network. In one embodiment in which the first wireless network is a WiFi network, for example, the network security information includes a service set identifier (SSID) associated with the WiFi network and/or a passphrase associated with the WiFi network.

At block 406, the first device is caused to wirelessly transmit, for reception by the second device, a signal carrying the encrypted network security information generated at block 404. In an embodiment, the signal carrying the encrypted network security information is a beacon associated with a second wireless network for which the first device acts as an AP (e.g., a microAP), or is another suitable broadcast signal, and is not specifically addressed (and/or is not solely addressed) to the second device. In various embodiments, the first device is caused to wirelessly transmit the beacon (or other signal) by sending a command or request to transmit (e.g., generating a request at a controller and sending the request to a network interface, in an embodiment), by generating and providing a signal to be transmitted (e.g., generating an information element at a controller and providing the information element to a network interface for transmission, in an embodiment), or in another suitable manner.

In some embodiments, the method 400 includes one or more additional blocks not shown in FIG. 5. In one embodiment, for example, the method 400 includes an additional block, prior to block 402, in which the first device is caused to securely connect to the first wireless network using the network security information (e.g., after being provisioned according to a conventional provisioning technique, in an embodiment). As another example, in an embodiment, the method 400 includes, prior to block 402, detecting the second device, and causing the first device to report to the remote server that the second device has been detected. In one such embodiment, detecting the second device includes detecting a first beacon transmitted by the second device, where the first beacon is associated with a second wireless network for which the second device acts as an AP or microAP, and the first device is caused to wirelessly transmit the signal at block 406 at least in part by causing the first device to wirelessly transmit a second beacon that includes an information element containing the encrypted network security information, where the second beacon is associated with a third wireless network for which the first device acts as a microAP. Further, in one such embodiment, the method 400 includes receiving, at the first device and from the remote server, a unique identifier of the second device (e.g., at block 402, along with the public key), and the information element in the second beacon contains not only the encrypted network security information, but also the unique identifier. Alternatively or additionally, in an embodiment, the method 400 includes causing the first device to wirelessly transmit a plurality of beacons, with each of the plurality of beacons including the information element containing the encrypted network security information. In this latter embodiment, the method 400 also includes a block in which an indication that the second device has been provisioned from the remote server (e.g., via the first wireless network and an Internet connection) is received, and a block in which, in response to receiving the indication, the first device is caused to omit the information element that contains the encrypted network security information from subsequent beacons.

Figure 6:
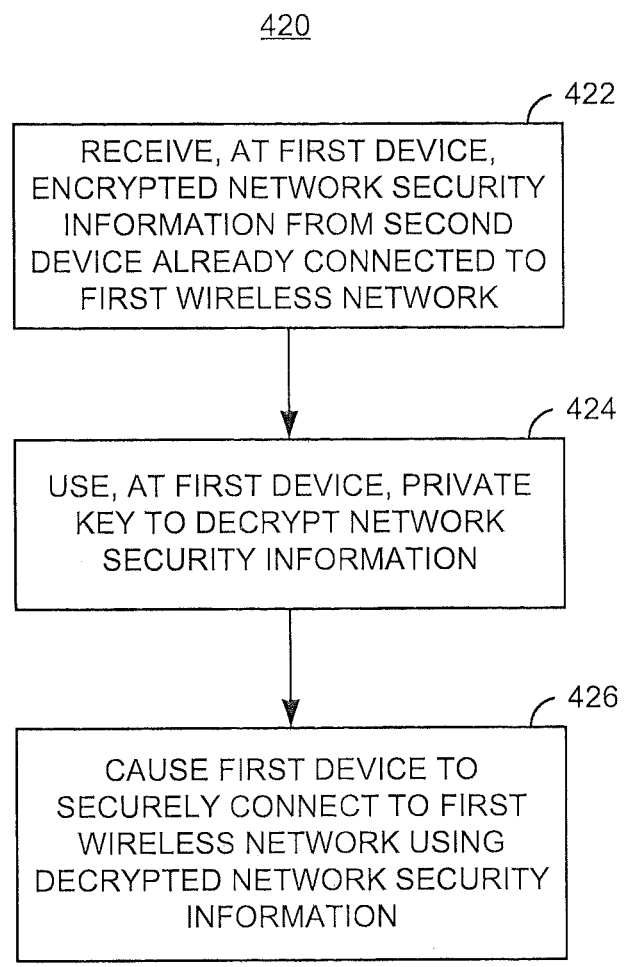
FIG. 6 is a flow diagram of an example method, implemented in a first device not yet connected to a wireless network, of provisioning the first device for connection to the wireless network with the assistance of a second device already connected to the wireless network, according to an embodiment.

FIG. 6 is a flow diagram of an example method 420, implemented in a first device not yet connected to a first wireless network, of provisioning the first device for connection to the first wireless network with the assistance of a second device already connected to the wireless network, according to an embodiment. In an embodiment, the first wireless network is a WiFi network similar to home network 12 of FIG. 1. In other embodiments, the first wireless network is a different, suitable network, such as a non-WiFi WLAN or WPAN, either within a home or in a different setting. In an embodiment, the method 420 is implemented in a device similar to or the same as device 24 of FIGS. 1 and 2. More specifically, in some embodiments, the method 420 is implemented by a controller similar to or the same as controller 112 of FIG. 2, and/or by a network interface similar to or the same as network interface 110 of FIG. 2. In other embodiments, the method 420 is implemented by a controller that includes the functionality of a network interface (e.g., controller 102, in an embodiment in which controller 102 includes network interface 100).

At block 422, encrypted network security information is received from the second device already connected to the first wireless network (e.g., from device 22 of FIGS. 1 and 2, in an embodiment). The network security information is information that can be used to securely connect to the first wireless network. In one embodiment in which the first wireless network is a WiFi network, for example, the network security information includes an SSID, and/or a passphrase, associated with the WiFi network. Prior to being received at block 422, the network security information was encrypted using a public key corresponding to (i.e., part of a public-private key pair with) a private key stored in the first device. In an embodiment, the network security information was encrypted at the second device. In some embodiments, the network security information is contained in an information element within a beacon received from the second device (e.g., a beacon associated with a second wireless network for which the second device acts as a microAP). In one such embodiment, the information element of the beacon also contains a unique identifier of the first device.

At block 424, the private key stored in the first device is retrieved and used to decrypt the encrypted network security information that was received at block 422. In an embodiment, the private key is stored in a memory similar to memory 114 of FIG. 2. The private key is retrieved and used to decrypt the encrypted network security information in response to receiving the encrypted network security information (and/or in response to receiving the unique identifier of the first device) at block 422, in some embodiments.

At block 426, the first device is caused to securely connect to the first wireless network using the network security information (e.g., SSID and/or passphrase) that was decrypted at block 424. In some embodiments, the secure connection is established in any suitable (e.g., conventional) manner.

In some embodiments, the method 420 includes one or more additional blocks not shown in FIG. 6. In one embodiment, for example, the method 420 includes an additional block, prior to block 422, in which the first device is caused to wirelessly transmit a beacon, where the beacon is associated with a second wireless network for which the first device acts as a microAP. In an embodiment, the beacon associated with the second wireless network allows the second device to detect the first device, and to proceed with obtaining the public key (e.g., from a remote server) and/or using the public key to encrypt the network security information.

In another example embodiment, the method 420 includes an additional block, after block 426, in which the first device is caused to report to a remote server (e.g., via the first wireless network and an Internet connection) that the first device has been provisioned. In yet another example embodiment, the method 420 includes an additional block in which the first device is caused to scan one or more channels to determine available wireless networks, and receiving the encrypted network security information at block 422 includes receiving a beacon (including an information element that contains the encrypted network security information) on one of the scanned channels.

In an embodiment, a method, implemented in a first device connected to a first wireless network, is for assisting in provisioning a second device for connection to the first wireless network. The method includes receiving, at the first device and from a remote server via the first wireless network, a public key corresponding to a private key stored in the second device. The method also includes using, at the first device, the public key to encrypt network security information stored in the first device, wherein the network security information includes information that is useable to securely connect to the first wireless network. The method further includes causing the first device to wirelessly transmit, for reception by the second device, a signal carrying the encrypted network security information.

In other embodiments, the method comprises any combination of one or more of the following features.

The method further comprises causing the first device to securely connect to the first wireless network using the network security information prior to receiving the public key from the remote server.

The method further comprises, prior to receiving the public key from the remote server: detecting, at the first device, the second device; and causing the first device to report to the remote server that the second device has been detected.

Detecting the second device includes detecting a first beacon transmitted by the second device, wherein the first beacon is associated with a second wireless network for which the second device acts as an access point; and causing the first device to wirelessly transmit a signal carrying the encrypted network security information includes causing the first device to wirelessly transmit a second beacon including an information element that contains the encrypted network security information, wherein the second beacon is associated with a third wireless network for which the first device acts as an access point.

The method further comprises receiving, at the first device and from the remote server, a unique identifier of the second device, wherein causing the first device to wirelessly transmit a second beacon includes causing the first device to wirelessly transmit a second beacon including an information element that contains (i) the encrypted network security information and (ii) the unique identifier of the second device.

The method further comprises causing the first device to wirelessly transmit a plurality of beacons associated with the third wireless network, wherein each of the plurality of beacons includes the information element that contains the encrypted network security information; receiving, at the first device and from the remote server via the first wireless network, an indication that the second device has been provisioned; and in response to receiving the indication that the second device has been provisioned, causing the first device to omit the information element that contains the encrypted network security information from subsequent beacons.

The first wireless network is a home network.

The network security information includes one or both of (i) a service set identifier (SSID) associated with the first wireless network and (ii) a passphrase associated with the first wireless network.

In another embodiment, a device comprises a memory storing network security information, wherein the network security information includes information that is useable to securely connect to a first wireless network. The device also comprises a controller that is (i) operable as a station of the first wireless network and (ii) operable as an access point of a second wireless network. The controller is configured to receive a public key via the first wireless network, wherein the public key corresponds to a private key stored in a different device, encrypt the network security information using the public key, and cause the device to transmit, for reception by the different device, a beacon associated with the second wireless network, wherein the beacon associated with the second wireless network includes the encrypted network security information.

In other embodiments, the device comprises any combination of one or more of the following features.

The controller is further configured to cause the device to securely connect to the first wireless network using the network security information.

The controller is further configured to: detect the different device by detecting a beacon associated with a third wireless network for which the different device acts as an access point; and cause the device to report to a remote server, via the first wireless network, that the different device has been detected.

The network security information includes one or both of (i) a service set identifier (SSID) associated with the first wireless network and (ii) a passphrase associated with the first wireless network.

In yet another embodiment, a method, implemented in a first device, is for provisioning the first device for connection to a first wireless network. The method includes receiving, at the first device, encrypted network security information from a second device already connected to the first wireless network, wherein the encrypted network security information was encrypted using a public key corresponding to a private key stored in the first device. The method additionally includes using, at the first device, the private key to decrypt the encrypted network security information, and causing the first device to securely connect to the first wireless network using the decrypted network security information.

In other embodiments, the method comprises any combination of one or more of the following features.

The method further comprises, prior to receiving the encrypted network security information, causing the first device to wirelessly transmit a beacon, wherein the beacon is associated with a second wireless network for which the first device acts as an access point.

The method further comprises, after causing the first device to connect to the first wireless network, causing the first device to report to a remote server that the first device has been provisioned.

Receiving encrypted network security information includes receiving a beacon including an information element that contains (i) the encrypted network security information and (ii) a unique identifier of the first device; and the beacon is associated with a second wireless network for which the second device acts as an access point.

The method further comprises causing the first device to scan channels to determine available wireless networks, wherein receiving the beacon includes receiving the beacon on one of the scanned channels.

In still another embodiment, a device comprises a memory storing a private key. Additionally, the device comprises a controller configured to receive encrypted network security information from a different device already connected to a first wireless network, wherein the encrypted network security information was encrypted using a public key corresponding to the private key. The controller is also configured to use the private key to decrypt the encrypted network security information, and cause the device to securely connect to the first wireless network using the decrypted network security information.

In other embodiments, the device comprises any combination of one or more of the following features.

The controller is configured to receive the encrypted network security information by receiving a beacon that includes an information element containing the encrypted network security information, and wherein the beacon is associated with a second wireless network for which the different device acts as an access point.

The memory further stores a unique identifier of the device, and the information element further contains the unique identifier of the device.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, implemented in a first device connected to a first wireless network, of assisting in provisioning a second device for connection to the first wireless network, the first wireless network comprising an access point, the method comprising:
    while the first device operates as a station in the first wireless network, receiving, at the first device, a public key corresponding to a private key stored in the second device, the public key having been transmitted by a remote server and received, at the first device, via the access point of the first wireless network;
    using, at the first device, the public key to encrypt network security information stored in the first device; and
    responsive to receiving the public key, the first device wirelessly transmitting, with a transceiver of the first device, a beacon signal carrying i) the encrypted network security information and ii) information usable by the second device to recognize that the beacon signal includes information intended for the second device so that the second device can decrypt the network security information with the private key and use the network security information to connect to the first network, wherein the beacon signal is associated with a second wireless network and the beacon signal is a repetitive wireless message being transmitted periodically in the second wireless network.

2. The method of claim 1, further comprising, prior to receiving the public key from the remote server:
    securely connecting, with the transceiver, to the first wireless network using the network security information.

3. The method of claim 1, further comprising, prior to receiving the public key from the remote server:
    detecting, at the first device, the second device; and
    reporting, with the transceiver, to the remote server, via the access point of the first wireless network, that the second device has been detected.

4. The method of claim 3, wherein:
    the beacon signal is a first beacon that includes an information element containing the encrypted network security information; and
    detecting the second device includes detecting a second beacon transmitted by the second device, wherein the second beacon is associated with a third wireless network.

5. The method of claim 4, wherein the information usable by the second device to recognize that the first beacon signal includes information intended for the second device comprises a unique identifier of the second device, the method further comprising:
    receiving, at the first device, the unique identifier of the second device, the unique identifier having been transmitted by the remote server and received, at the first device, via the access point of the first wireless network, wherein the information element in the first beacon also contains the unique identifier of the second device.

6. The method of claim 4, wherein:
    the first beacon signal comprises a first plurality of beacons associated with the second wireless network, wherein each of the first plurality of beacons includes the information element that contains the encrypted network security information; and
    the method further comprises:
        receiving, at the first device, an indication that the second device has been provisioned, the indication having been transmitted by the remote server and received, at the first device, via the access point of the first wireless network, and
        in response to receiving the indication that the second device has been provisioned, stopping transmission, with the transceiver, of beacons that include the information element that contains the encrypted network security information.

7. The method of claim 1, wherein the first wireless network is a home network.

8. The method of claim 1, wherein the network security information includes one or both of (i) a service set identifier (SSID) associated with the first wireless network and (ii) a passphrase associated with the first wireless network.

9. A first device comprising:
    a memory storing network security information; and
    a transceiver; and
    a controller, including a physical processor, that is (i) operable as a station of a first wireless network that comprises an access point, and (ii) operable as an access point of a second wireless network, wherein the controller is configured to
        while operating as a station of the first wireless network, receive a public key via the access point of the first wireless network, wherein the public key corresponds to a private key stored in a second device, the public key having been transmitted by a remote server and received, at the transceiver of the first device, via the access point of the first wireless network,
        encrypt the network security information using the public key, and
        while operating as the access point of the second wireless network and responsive to receiving the public key, control the transceiver so that the first device transmits, with the transceiver, a beacon associated with the second wireless network for reception by the second device, wherein the beacon associated with the second wireless network includes i) the encrypted network security information and ii) information usable by the second device to recognize that the beacon includes information intended for the second device so that the second device can decrypt the network security information and use the network security information to connect to the first network, and wherein the beacon is a repetitive wireless message being transmitted periodically in the second wireless network.

10. The first device of claim 9, wherein the controller is further configured to cause the first device to securely connect to the first wireless network using the network security information.

11. The first device of claim 9, wherein the controller is further configured to:
  detect the second device by detecting a beacon associated with a third wireless network for which the second device acts as an access point; and
  cause the transceiver of the first device to report to a remote server, via the first wireless network, that the second device has been detected.

12. The first device of claim 9, wherein the network security information includes one or both of (i) a service set identifier (SSID) associated with the first wireless network and (ii) a passphrase associated with the first wireless network.

13. A method, implemented in a first device, of provisioning the first device for connection to a first wireless network, the method comprising:
  receiving, at a transceiver of the first device, a beacon signal transmitted from a second device, the second device operating as a station of the first wireless network, wherein the second device transmits the beacon signal as part of a second wireless network, the beacon signal being a repetitive wireless message transmitted periodically in the second wireless network,
    wherein the beacon signal includes i) a vendor-specific information element that identifies the first device and ii) encrypted network security information, wherein the encrypted network security information was encrypted using a public key corresponding to a private key stored in the first device;
  using, at a physical processor of the first device, the vendor-specific information element to recognize that the beacon signal includes information intended for the first device;
  in response to recognizing that the beacon signal includes information intended for the first device, using, at the physical processor of the first device, the private key to decrypt the encrypted network security information; and
  responsive to decrypting the encrypted network security information, the first device securely connecting, with the physical processor and the transceiver, to the first wireless network using the decrypted network security information.

14. The method of claim 13, wherein:
  the beacon signal is a first beacon;
  the method further comprises, prior to receiving the first beacon, wirelessly transmitting, with the physical processor and the transceiver, a second beacon, wherein the second beacon is associated with a third wireless network for which the first device acts as an access point; and
  the first beacon is transmitted in response to the second beacon.

15. The method of claim 13, further comprising, after the first device connects to the first wireless network, reporting, with the physical processor and the transceiver, to a remote server that the first device has been provisioned.

16. The method of claim 13, wherein receiving the beacon signal includes receiving, in the beacon signal, an information element that contains (i) the encrypted network security information and (ii) the information identifying the first device, and wherein the beacon signal is associated with the second wireless network.

17. The method of claim 16, further comprising:
  scanning, with the physical processor and the transceiver, channels to determine available wireless networks,
  wherein receiving the beacon signal includes receiving the beacon on one of the scanned channels.

18. A first device comprising:
  a memory storing a private key;
  a transceiver; and
  a controller, including a physical processor, configured to
    receive, via the transceiver, a beacon signal transmitted by a second device acting i) as a station of a first wireless network and ii) as an access point of a second wireless network,
      wherein the beacon signal comprises a vendor-specific information element that i) identifies the first device and ii) encrypted network security information, wherein the encrypted network security information was encrypted using a public key corresponding to the private key stored in the first device, and wherein the beacon signal is a repetitive wireless message transmitted periodically in the second wireless network,
    use the information identifying the first device to recognize that the beacon signal includes information intended for the first device;
    in response to recognizing that the beacon signal includes information intended for the first device, use the private key to decrypt the encrypted network security information, and
    responsive to decrypting the encrypted network security information, control the transceiver so that the first device securely connects, with the transceiver, to the first wireless network using the decrypted network security information.

19. The first device of claim 18, wherein:
  the beacon signal is a first beacon;
  the controller is configured to, prior to receiving the first beacon, wirelessly transmit, with the transceiver, a second beacon, wherein the second beacon is associated with a third wireless network for which the first device acts as an access point; and
  the first beacon is transmitted in response to the second beacon.

* * * * *